United States Patent [19] [11] Patent Number: 4,928,182
Guerinot et al. [45] Date of Patent: May 22, 1990

[54] DUAL ASPECT RATIO DISPLAY WITH CYCLICLY MOVING RASTER AREA TO PREVENT UNEVEN PHOSPHOR AGING

[75] Inventors: William F. Guerinot, Knoxville; Ralph H. Bradley, Kingsport; Stephen T. Troemel, Jefferson City, all of Tenn.

[73] Assignee: North American Philips Corporation, New York, N.Y.

[21] Appl. No.: 304,736

[22] Filed: Jan. 31, 1989

[51] Int. Cl.⁵ ............................................. H04N 3/223
[52] U.S. Cl. .................................... 358/245; 358/141; 358/242
[58] Field of Search ............... 358/140, 141, 230, 242, 358/180, 188

[56] References Cited
U.S. PATENT DOCUMENTS
4,670,784 6/1987 Goldberg ............................ 358/141
FOREIGN PATENT DOCUMENTS
8700058 8/1988 Netherlands .

Primary Examiner—James J. Groody
Assistant Examiner—Mark R. Powell
Attorney, Agent, or Firm—Edward W. Goodman

[57] ABSTRACT

A wide screen television monitor capable of displaying standard width picture in which uneven "Coulomb aging" is minimized. The television monitor includes circuitry for causing the standard width picture to cyclically traverse the width of the display screen of the television monitor in accordance with a prescribed function. The period of repetition of this movement is of such a duration that a casual observer of the television monitor is unaware of the movement of the picture.

17 Claims, 5 Drawing Sheets

Exemplary Dither Waveform

Charge per Unit Area

Relative Phosphor Efficiency

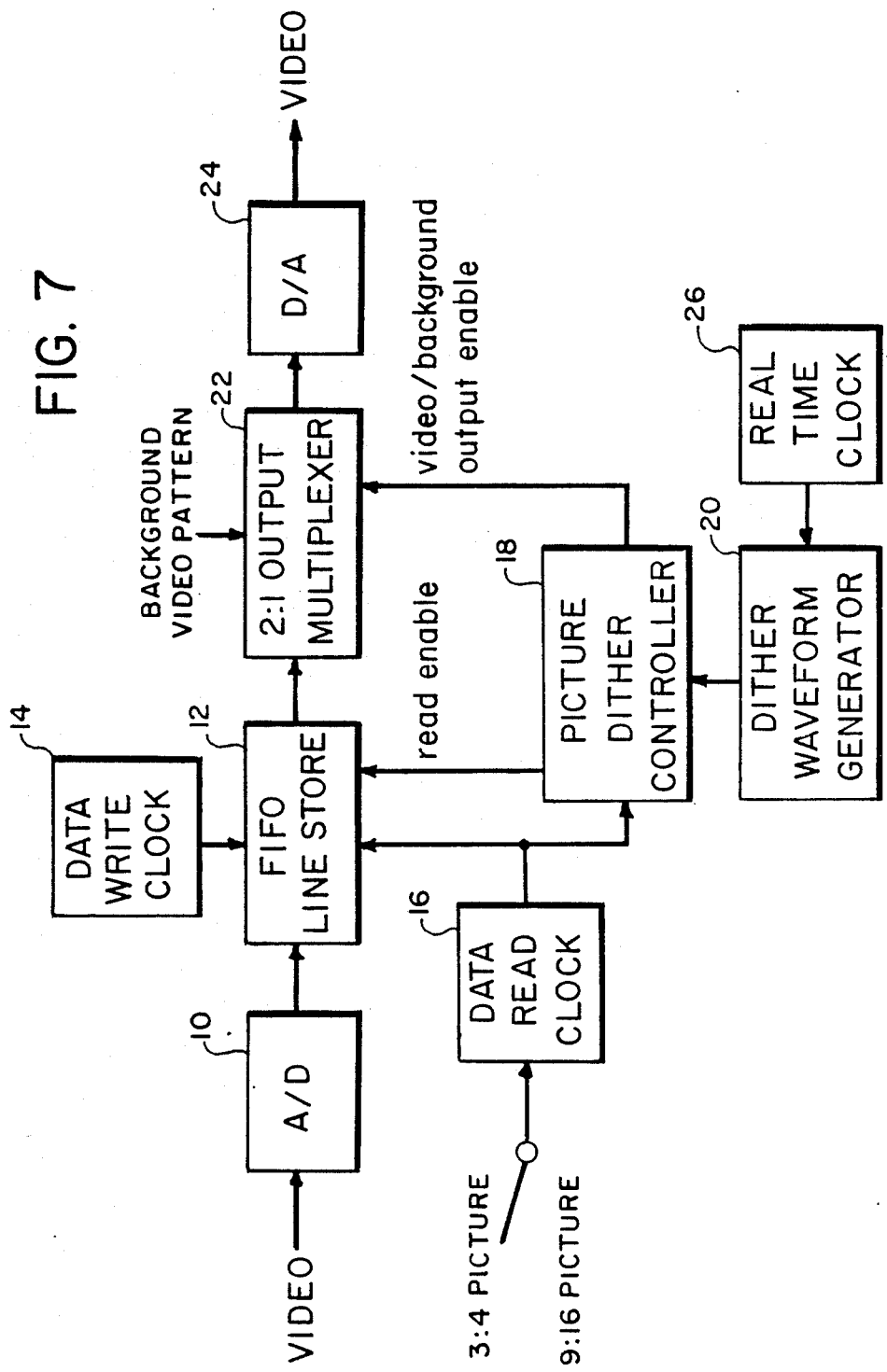

DUAL ASPECT RATIO DISPLAY WITH CYCLICLY MOVING RASTER AREA TO PREVENT UNEVEN PHOSPHOR AGING

BACKGROUND OF THE INVENTION

The subject invention relates to a television monitor capable of displaying wide aspect ratio pictures having an aspect ratio of, for example 9:16 and, more particularly, capable of selectively displaying standard width pictures having an aspect ratio of 3:4.

A television monitor is characteristically produced with a layer of luminous phosphor on the inside surface of its face plate. The phosphor is selectively impinged by an electron beam and, as a result, luminesces forming the picture to be displayed. Over the course of time, due to this exposure to electron beams, the phosphor loses a certain amount of efficiency, this irreversible degradation being known as "Coulomb aging". Although the loss of phosphor efficiency varies in different ways according to the beam current time of exposure, and other details, in the following, "Coulomb aging" will be used to refer to the phenomenon of loss of phosphor efficiency as a consequence of exposure to a raster scan.

Applicants have determined that a differential scanning of a phosphor screen in a CRT of as few as one Coulomb will produce a 1 percent difference in phosphor luminance efficiency. An abrupt step change of 1 percent luminance is visible to the casual observer.

Hence, in implementing a dual aspect ratio monitor, it is necessary to manage the effect of differential loss of phosphor efficiency. This differential aging is a direct consequence of using less of the phosphor screen width when displaying a 3:4 aspect ratio picture on a 9:16 aspect ratio display in which the height has been kept constant. In particular, that portion of the phosphor required to display the 3:4 aspect ratio picture receives an average additional amount of charge proportional to the average instantaneous beam current times the time that this standard picture is being displayed. During the portion of time that a 9:16 aspect ratio picture is being displayed, all of the phosphor, on the average, receives the same charge per unit area and no problem arises.

The percentage of phosphor used for displaying 9:16 aspect ratio pictures but not used to display 3:4 aspect ratio pictures is readily calculated. If the height of the phosphor used is h, then in the first case, the width used is $h \times 4/3$, and in the second case the width used is $h \times 16/9$. Thus, the fraction of width unused in the first case is:

$$(h \times 16/9 - h \times 4/3)/(h \times 16/9)$$

The h term cancels out. Multiplying the numerator and denominator by 9 to eliminate fractions yields:

$$(16-12)/16 \text{ or } 4/16 \text{ or } 1/4.$$

Thus, the standard aspect ratio picture has 25 percent less picture width for the same picture height than the wide aspect ratio picture (see FIG. 1). Conversely, the wide aspect ratio picture has 33⅓ percent greater width.

SUMMARY OF THE INVENTION

An object of the present invention is to reduce the visible effect of additional loss of phosphor efficiency of the portion of the phosphor used in displaying a narrower aspect ratio picture on a wide aspect ratio monitor.

This object is achieved in a wide aspect ratio television monitor of the above type when displaying a narrower aspect ratio picture, by causing the position of the picture to drift in a controlled, programmed manner between an extreme left position and an extreme right position on the display of the monitor.

BRIEF DESCRIPTION OF THE DRAWINGS

With the above and additional objects and advantages in mind as will hereinafter appear, the subject invention will be described with reference to the accompanying drawings, in which:

FIG. 7 shows a block diagram of an arrangement for incorporating the invention in a wide aspect ratio television monitor.

DESCRIPTION OF THE PREFERRED EMBODIMENT

Figure 1:
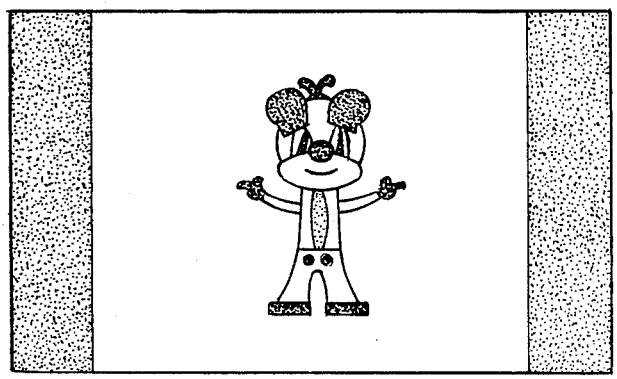
FIG. 1 shows a wide aspect ratio display on which a narrower aspect ratio picture is being displayed.
Figure 2A:
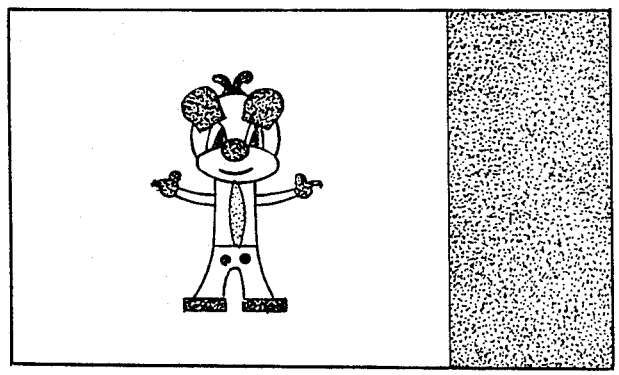
FIGS. 2A and 2B show the display of FIG. 1 in which the picture occupies the extreme left and extreme right positions of the display, respectively.
Figure 2B:
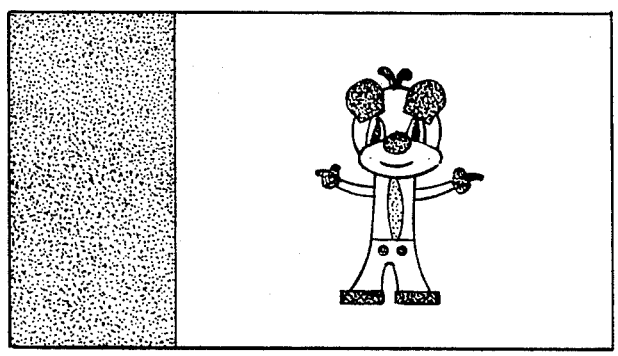

The subject invention proposes to minimize the visible effect of differential "Coulomb aging" when a, for example, standard 3:4 aspect ratio picture is displayed on a television monitor having a 9:16 aspect ratio display. As noted above, the standard picture is moved in a programmed fashion across the width of the display to spread out any variation in the "Coulomb aging". FIGS. 1, 2A and 2B illustrate a 9:16 aspect ratio display on which a standard picture is being displayed, in which the figures show the standard picture positioned in the middle, to the extreme left, and to the extreme right, respectively, of the 9:16 display.

Figure 3:
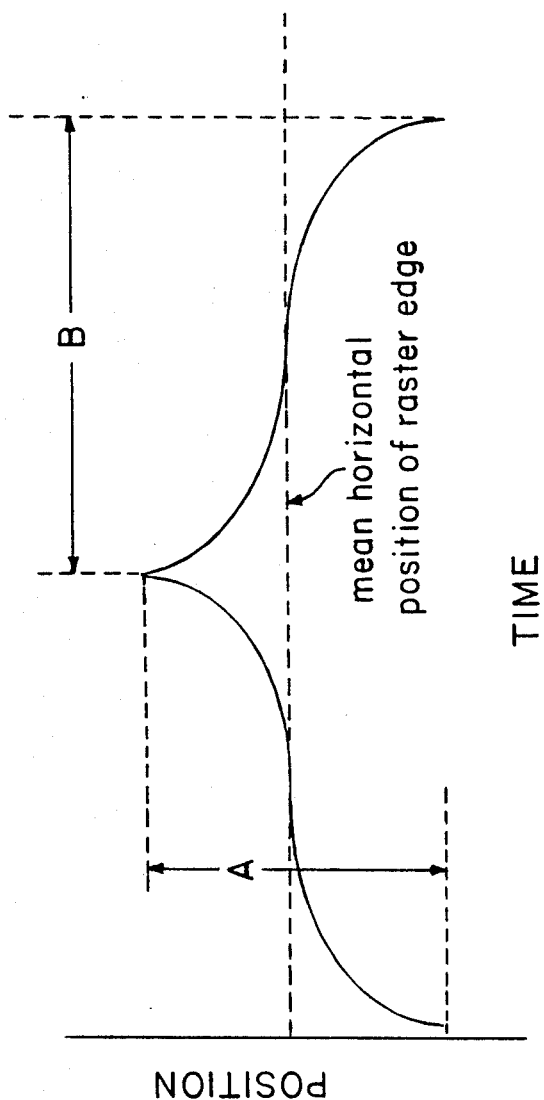
FIG. 3 shows a sample waveform of the dither signal.

Although there are numerous functions which may be used for the dither waveform, applicants have found the waveform shown in FIG. 3 to be preferable. Using a dither waveform of this type, the standard picture approaches the extreme left and right sides of the display in a smooth and complementary manner with the speed of its movement gradually increasing from the center to either side and then gradually decreasing from either side to the center. Arranged as such, abrupt uneven "Coulomb aging" between the edges and the center of the display is minimized. In order for the movement of the 3:4 aspect ratio picture to not be perceptible by the casual observer, it is necessary that the period of the dither waveform be greater than one hour.

Figure 4A:
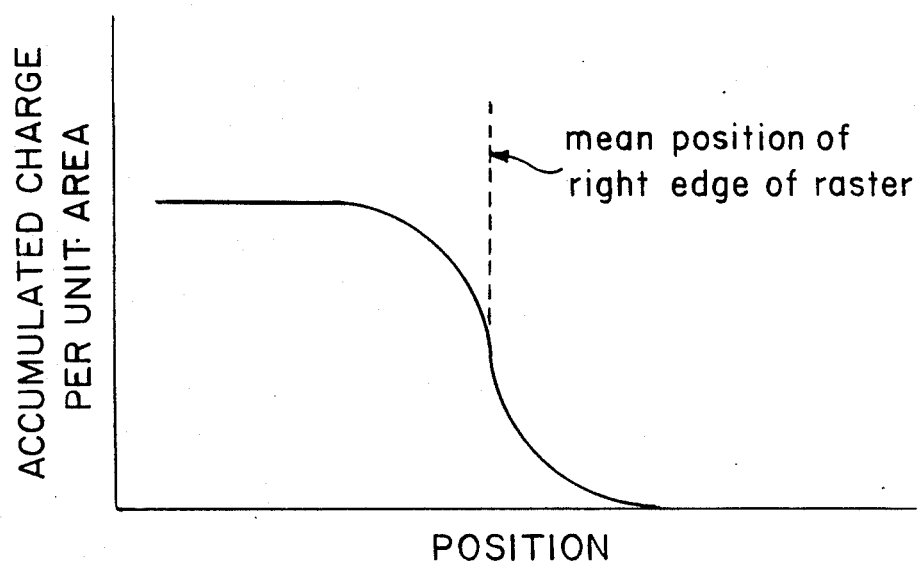
FIGS. 4A and 4B show graphs illustrating the total integrated charge distribution of current falling onto a phosphor screen for the right and left edges of a picture dithered in accordance with the invention.
Figure 4B:
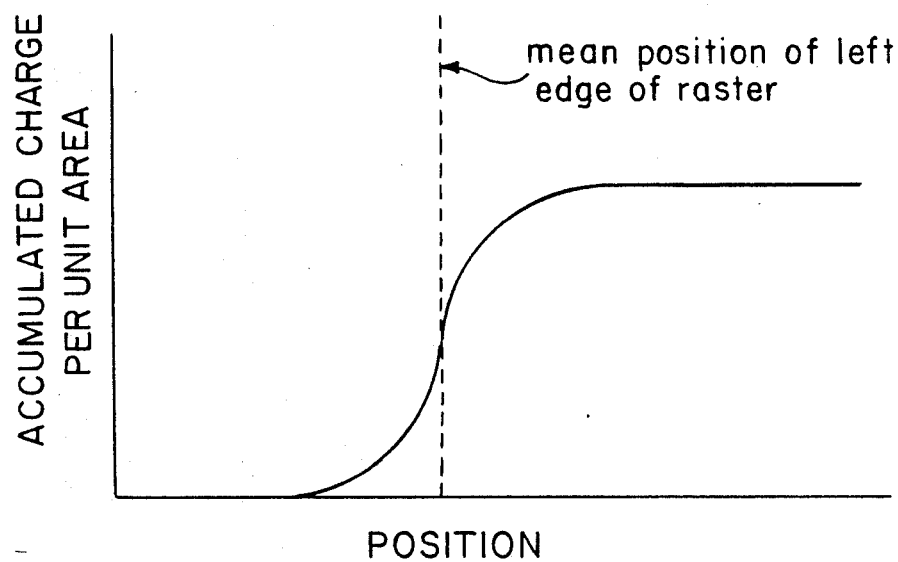

FIGS. 4A and 4B illustrate the way in which the total integrated charge distribution of current falling onto a phosphor screen will vary for both the right edge and the left edge of a standard picture dithered in accordance with the waveform of FIG. 3. The shape of the transition region, where the integrated charge density passes from a maximum to a minimum, has substantially the form of the inverse of the dither waveform. This results because, for each position in the transition region, the average integrated charge varies in proportion to the fraction of time that the edge of the picture position is greater than or less than that position.

Figure 5:
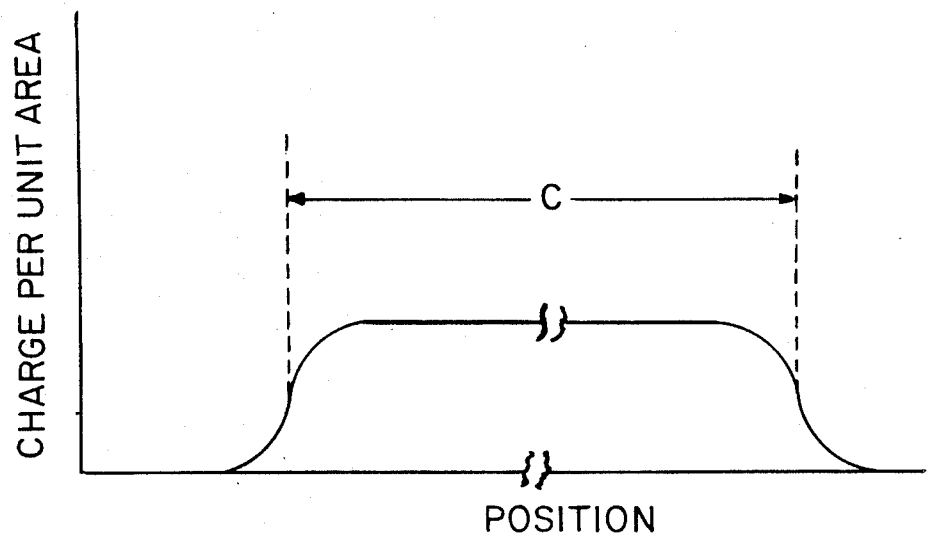
FIG. 5 shows a graph representing the overall integrated charge per unit area from the left side of the display to the right side of the display.

FIG. 5 represents the overall integrated charge per unit area from the left side of the display to the right side of the display. The dimension C is the width of the picture at any small interval of time, during which the dither waveform has, perceptually, no effect.

Because the phosphor efficiency degrades monotonically with the integrated total amount of Coulomo charge density passed through it since the CRT was manufactured, at least once the degradation commences, this form of dither function will cause the resulting transitions for peak phosphor efficiency to average phosphor efficiency and average phosphor efficiency to minimum phosphor efficiency to both occur with complementary smoothness.

Figure 6:
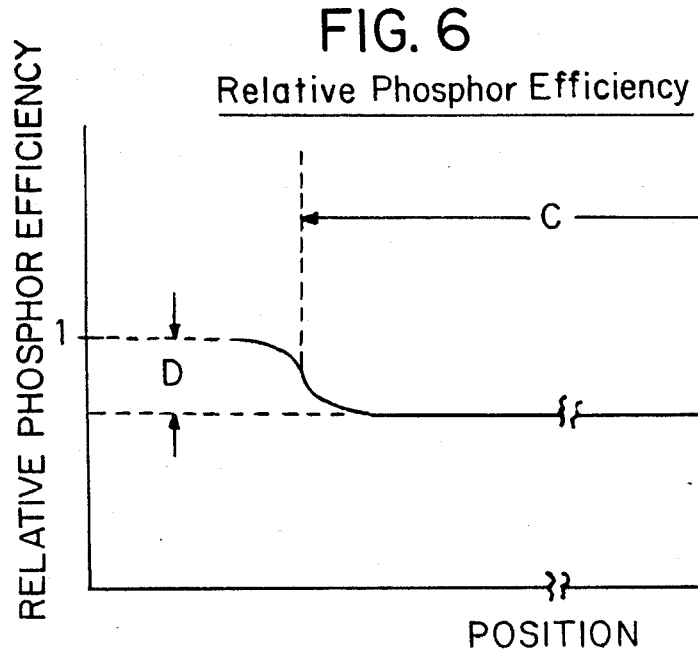
FIG. 6 shows a graph representing the change in phosphor efficiency to the efficiency of the unused phosphor.

FIG. 6 shows the resulting change in phosphor efficiency, relative to the efficiency of the phosphor not used for the standard picture. The relative loss in efficiency of the main portion of the phosphor used in the standard picture is indicated by D.

It should thus be apparent that the dither waveform of FIG. 3 causes a smooth joining of the region of the phosphor across which efficiency varies to the adjoining regions of uniform efficiency. Such a form leaves no sharply delineated border for the edge processing functions of the human visual system to discriminate. Experimental simulation has shown that a degradation of phosphor efficiency across the transition region of 30 percent can be rendered virtually unnoticeable through the elimination of delineated luminance borders.

In order for the human visual system to perceive uniform brightness to the edges and corners of an image, it is preferred that a dark border surround the display. This may be arranged for the top and bottom of the display edges by surrounding the display screen with a dark bezel. For the left and right edges of the standard picture, it has been assumed that the side panels would be dark. However, it is sufficient for only the portions of the side panels immediately adjacent to the picture to be dark. To accomplish this, the luminance of the side panels can be gradually increased in a smooth way away from the side of the picture. This can result in increasing the number of hours of display operation with a standard aspect ratio picture before reaching the 30 percent phosphor efficiency differential when the loss of efficiency becomes noticeable. For example, if the luminance of the border is gradually increased to 50 percent or more of the average luminance of the picture, moving towards the edge of the screen, the dither waveform will still cause a perceptually smooth transition of the phosphor efficiency, but the differential Coulomb per unit area exposure of the phosphor may be reduced by a factor of two or more. If desired, even longer periods of standard picture operation can be supported by causing the luminance of the side panels to rise to more nearly the mean luminance of the displayed image. It should also be apparent that while the luminance of the side panels may be gradient depending on the distance from the standard aspect ratio picture, the luminance of the panels may alternatively be constant at, for example, 50% of the overall luminance of the standard picture. Alternatively, a selected luminance pattern may be used for the panels.

FIG. 7 shows an arrangement for effecting the dithering of a 3:4 aspect ratio picture in a 9:16 aspect ratio television monitor. Analog video data is converted to digital form in an analog-to-digital (A/D) converter 10. The converted data is then written into a First-In-First-Out line store (FIFO) 12 which is capable of being written into and read from at two different speeds under the control of a fixed data write clock 14 and a variable data read clock 16. Typically, when a 9:16 aspect ratio picture is being viewed, the FIFO 12 is being written into and read from at the same speed. However, when a 3:4 aspect ratio picture is being viewed, a control signal is applied to the data read clock 16 switching the read clock frequency so that the video data is read from the FIFO 12 at a faster rate than that at which the video data was written into the FIFO 12 according the data write clock 14. This enables the 3:4 aspect ratio picture to appear properly when viewed on the wide-screen monitor. A picture dither controller 18 then determines, based on a dither waveform applied thereto by a dither waveform generator 20, where, horizontally, the video data is to be displayed, frame by frame, on the screen by controlling the Read Enable input of the FIFO 12 and an output multiplexer 22, which causes the output of a background video pattern generator (not shown) to be displayed in the side panels. In other words, on a frame by frame basis, the relative widths of the side panels and consequently, the position of the standard aspect ratio picture, is controlled by the picture dither controller 18 selectively switching the multiplexer 22 and selectively applying a read enable signal to the FIFO 12. The output of the multiplexer 22 is then applied to a digital-to-analog converter 24 which in turn provides an analog video signal suitable for being displayed on the screen of the monitor.

Due to the long duration of a cycle of the dither waveform ($>1$ hr.), real time clock 26 is coupled to the dither waveform generator 20 for generating the dither waveform. The dither waveform generator 20 has a further feature that upon being stopped and then later restarted, the dither waveform continues from the same point it was when the generator was stopped.

Numerous alterations of the structure herein disclosed will suggest themselves to those skilled in the art. However, it is to be understood that the present embodiment is for purposes of illustration only and not to be construed as a limitation of the invention. All such modifications which do not depart from the spirit of the invention are intended to be included within the scope of the appended claims.

What is claimed is:

1. A method for displaying picture information on a picture display device having a display screen which is wider than pictures formed by said picture information, said method comprising the steps:

generating a dither waveform; and causing said pictures formed by said picture information to cyclically traverse the width of the display screen of said picture display device in response to said dither waveform.

2. A method for displaying picture information as claimed in claim 1, wherein a cycle of said dither waveform has such a period that a casual observer of said pictures on said display screen is unaware of the movement of the pictures.

3. A method for displaying picture information as claimed in claim 2, wherein said period is greater than one hour.

4. A method for displaying picture information as claimed in claim 3, wherein said dither waveform has a function such that the movement of said pictures on said display screen has a left-right symmetry about the times corresponding to the extreme picture position excursions left and right.

5. A method for displaying picture information as claimed in claim 4, wherein the dither waveform causes the pictures to approach the extreme picture position excursions left and right in a smooth and complementary manner.

6. A picture display device capable of selectively displaying pictures having a width narrower than a width of a display screen of said picture display device, said picture display device comprising:
   means for receiving picture information for forming pictures to be displayed;
   means for displaying said pictures formed from said picture information on said display screen;
   means for generating a dither waveform; and
   means for causing said pictures to cyclically traverse the width of said display screen in response to said dither waveform when the width of said pictures is narrower than the width of said display screen.

7. A picture display device as claimed in claim 6, wherein said pictures have an aspect ratio of 3:4 and said display screen has an aspect ratio of 9:16, and wherein a height of said pictures is the same as a height of said display screen.

8. A picture display device as claimed in claim 6, wherein said dither waveform generated by said generating means has a cycle of such a duration that a casual observer of said pictures on said display screen is unaware of the movement of the pictures.

9. A picture display device as claimed in claim 8, wherein said duration of said cycle of said dither waveform is greater than one hour.

10. A picture display device as claimed in claim 9, wherein said dither waveform has a function such that the movement of said pictures on said display screen has a left-right symmetry about the times corresponding to the extreme picture position excursions left and right.

11. A picture display device as claimed in claim 10, wherein the dither waveform causes the pictures to approach the extreme picture position excursions left and right in a smooth and complementary manner.

12. A picture display device as claimed in claim 6, wherein said means for causing said pictures to cyclically traverse a width of said display screen comprises;
   storage means for storing said picture information;
   means for writing said picture information into said storage means at a first rate;
   means for reading said picture information from said storage means at a second rate, wherein said second rate is faster than said first rate;
   a controllable switch coupled to an output of said reading means; and
   control means responsive to said dither waveform for controlling said switch.

13. A picture display device as claimed in claim 6, wherein said device further comprises means for adding a luminance signal to remaining portions of said display screen outside of said pictures.

14. A picture display device as claimed in claim 13, wherein said luminance signal produces a brightness in said remaining portions which is a predetermined percentage of an average brightness of said pictures.

15. A picture display device as claimed in claim 14, wherein said percentage is 50%.

16. A picture display device as claimed in claim 13, wherein said luminance signal generates a pattern in said remaining portions.

17. A picture display device as claimed in claim 13, wherein said luminance signal has a gradient which varies from zero at an edge of said pictures to a predetermined percentage of an average brightness of said pictures at an edge of said display.

* * * * *